J. C. DAVIS.
ORE AMALGAMATOR.
No. 34,881. Patented Apr. 8, 1862.
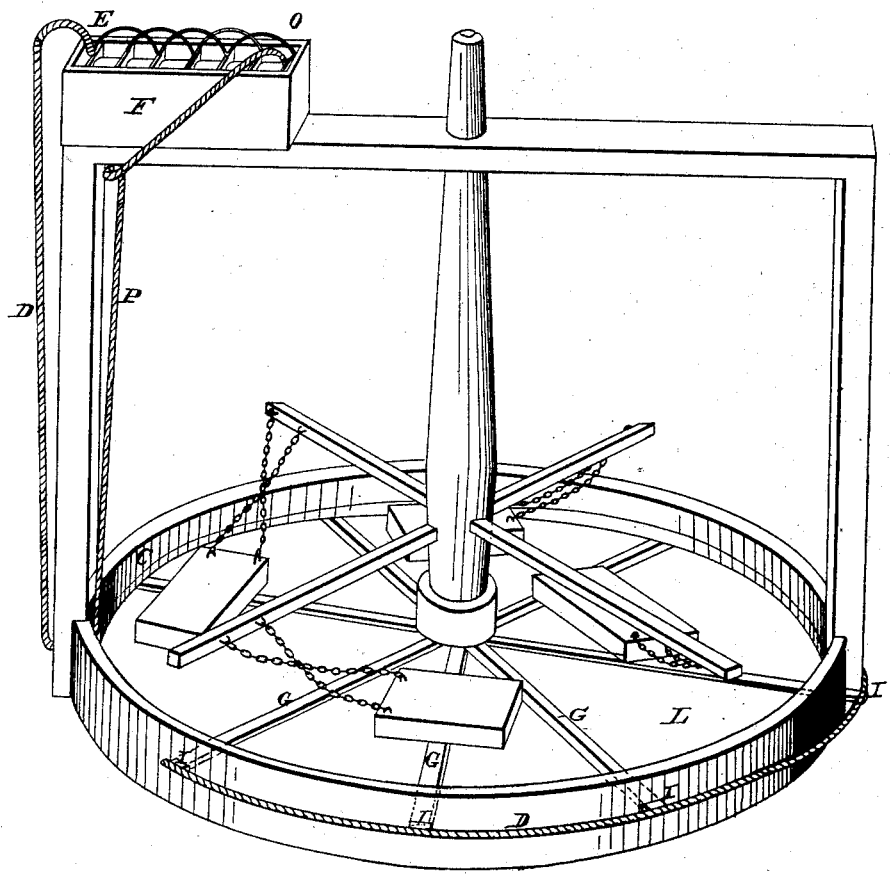
Witnesses.
Wm Stanwood
Inventor.
Jos C Davis
THE NORRIS PETERS CO., PHOTO-LITHO., WASHINGTON, D. C.

UNITED STATES PATENT OFFICE.

JOB C. DAVIS, OF ALAMEDA COUNTY, CALIFORNIA, ASSIGNOR TO EDWARD HALL, OF SAME PLACE.

IMPROVED ARRASTRA.

Specification forming part of Letters Patent No. 34,881, dated April 8, 1862.

*To all whom it may concern:*

Be it known that I, JOB C. DAVIS, of the county of Alameda and State of California, have invented new and useful Improvements in Arrastras; and I do hereby declare that the following is a full, clear, and exact description of the construction and operation of the same, reference being had to the accompanying drawing, making a part of this specification.

The nature of these improvements is as follows, viz: fitting stone arrastras with metallic plates or gutters coated with amalgam, as represented in the drawing, (see letter G,) or, if an iron arrastra, with copper gutters.

The arrastra should have an iron or copper band or ring, as shown at C, properly isolated and raised somewhat from the bottom of the arrastra. Around the outside of the arrastra is a copper rod, D, attached at one end to the negative pole E of a galvanic battery, F, and at the other end and along the entire length, at the proper points, by metallic connections with each of the gutter ends I, the inner band, C, to be connected with wire P of the positive pole O of the galvanic battery aforesaid, said battery to be placed in any convenient position.

Operation: The arrastra L being charged with dirt or pulverized ore containing precious metals, mixed with water or any suitable aqueous preparation, and properly connected with the galvanic battery, the current of galvanic electricity will pass through the entire mass containing mercury and precious metals, increasing the affinity between them; also, promoting the separation of the metals from their chemical combinations.

By employing the circumferential band C and the radial gutters G, and connecting the band as well as the outer ends of the gutters with the battery, the current created by the action of the battery is effectually and thoroughly distributed throughout the whole contents of the arrastra, and by this simple means the process of amalgamation is considerably facilitated.

Having described my invention, what I claim, and desire to secure by Letters Patent, is—

In the construction of arrastras, the combination of a circumferential metallic band, C, and metallic radial gutters G with wires D P and galvanic battery F, as above set forth.

JOB C. DAVIS.

Witnesses:
WM. STANWOOD,
CHAS. R. BOND.